United States Patent [19]

Bloom

[11] 4,012,792
[45] Mar. 15, 1977

[54] MAGNETIC HEAD DRUM CONFIGURATION HAVING A FRICTION REDUCING HELICAL STEP

[75] Inventor: Richard M. Bloom, Rochester, N.Y.

[73] Assignee: Eastman Kodak Company, Rochester, N.Y.

[22] Filed: Aug. 11, 1975

[21] Appl. No.: 603,557

[52] U.S. Cl. .............................. 360/130; 226/97; 360/102

[51] Int. Cl.² ................... G11B 15/64; G11B 5/60; B65H 17/32

[58] Field of Search ............... 360/130, 107, 102; 226/97

[56] References Cited

UNITED STATES PATENTS

| | | | |
|---|---|---|---|
| 3,333,753 | 8/1967 | Streets | 360/130 |
| 3,614,338 | 10/1971 | Bogels | 360/102 |
| 3,840,895 | 10/1974 | Kubo | 360/130 |
| 3,930,270 | 12/1975 | Tanigawa et al. | 360/130 |

*Primary Examiner*—Robert S. Tupper
*Attorney, Agent, or Firm*—G. E. Grosser

[57] ABSTRACT

A magnetic head drum includes an upper section that carries a set of magnetic heads and rotates at a preselected head speed, and a stationary lower section that is characterized by a reduced diameter step formed along the tape wrap path thereover (e.g., a helical path for a helical scan recorder). Because of the reduced diameter step, tape pressure is shifted from the lower drum section to the upper drum section which, by virtue of its rotation, produces a low friction air bearing. The reduction in diameter to produce the above-described step, moreover, results in a shoulder or ledge along the lower edge of the tape wrap path, which shoulder serves as a guide for the tape, and promotes accurate tape tracking over the drum.

The amount of reduction in diameter for the lower drum section is not chosen arbitrarily, but is preferably within a range of 1 to 6 mils. In this range, a desirable balance is achieved between reduction in frictional drag and limiting of forces tending to distort the tape. Moreover, it appears that a reduction greater than around 6 mils tends to result in increased tape flutter.

9 Claims, 8 Drawing Figures

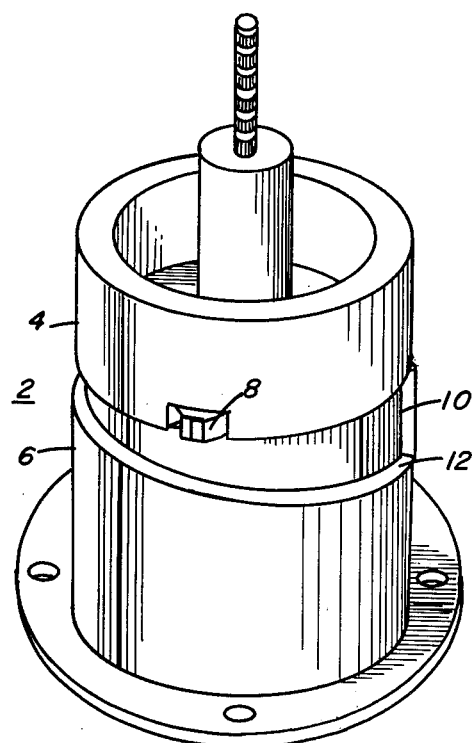
FIG. 1
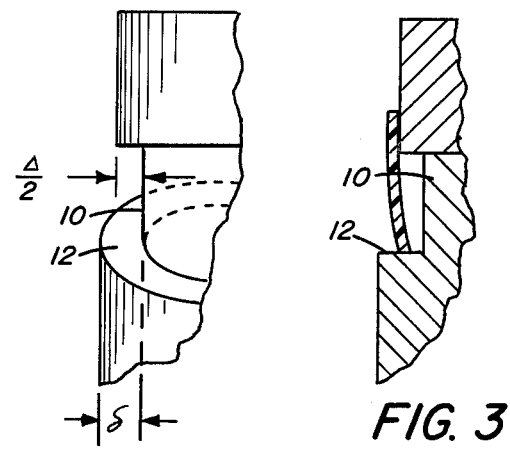
FIG. 2
FIG. 3
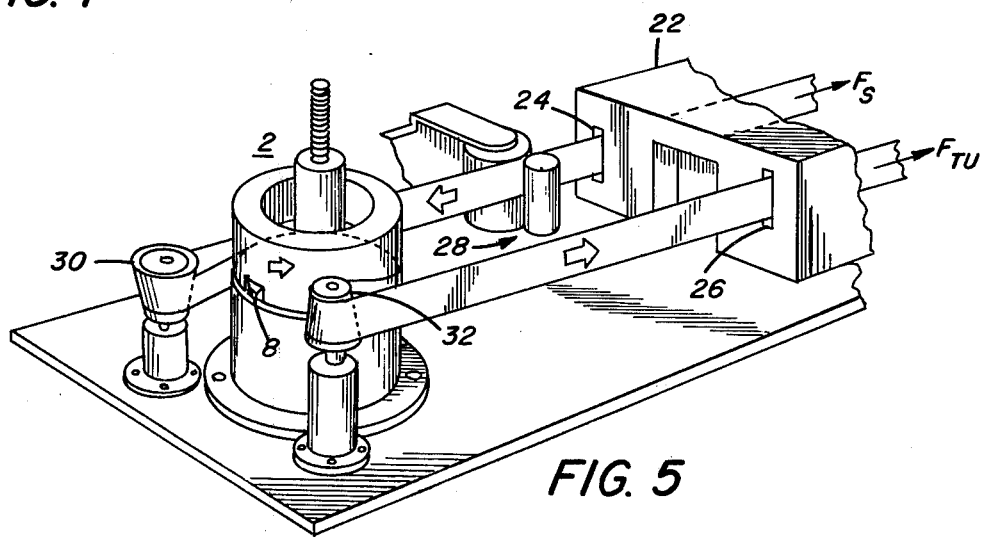
FIG. 5
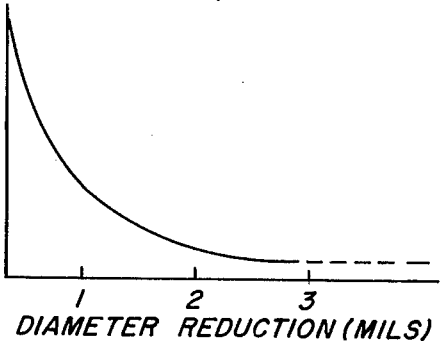
FIG. 4

MAGNETIC HEAD DRUM CONFIGURATION HAVING A FRICTION REDUCING HELICAL STEP

BACKGROUND OF THE INVENTION

1. Field of the Invention

The present invention relates, in general, to head drums for use in magnetic tape units and, more particularly, to a low-frictional-drag head drum configuration suited to use in helical-scan-type magnetic tape units.

2. Description Relative to the Prior Art

The movement of magnetic tape over a head drum is a critical aspect of the recording and the reading of magnetic records. As might be expected, there has been extensive development in the area of head drum design and various approaches have been taken to achieve desired head drum characteristics.

U.S. Pat. No. 3,428,524, for example, shows a helical-scan-type head drum wherein air ports are provided for forcing air beneath the magnetic tape so as to form an air bearing. By so forcing air under the tape, resistance to longitudinal tape movement over the stationary drum is greatly reduced. Such an arrangement, however, is quite complex and expensive.

Another type of drum utilizes a cylindrical drum unit which rotates at high speed (the speed of the magnetic heads). Because the drum rotates at high speed, an air film is created between the drum and the tape. With such a design, however, accurate guiding of the tape past the heads becomes difficult because the tape tends to float on the drum.

U.S. Pat. No. 3,510,604 describes a configuration wherein a rotating drum is specially tapered so as to cause air to be forced between the tape and the drum surface to produce an air bearing.

A split drum configuration is described in U.S. Pat. No. 3,436,491, which configuration utilizes an inwardly tapered upper drum section having a diameter at its bottom face that is less than the diameter of an adjacent stationary lower drum section. The taper is said to reduce frictional drag by reducing the buildup of oxides which are rubbed from the tape by the drum. This arrangement, as described, is intended for a helical-scan apparatus having a tape wrap angle approaching 360°.

U.S. Pat. No. 3,840,895 describes a split drum configuration having a rotating lower section which carries a set of heads and a coaxial, increased diameter upper section which is journaled so as to be rotated by the magnetic tape passing thereover. Because guide ridges are provided on the drum sections along the edges of the tape path, which ridges rotate with their respective sections, a circular, rather than helical, tape path must be utilized. Moreover, it is noted that the torque required to rotate the upper section acts as a drag on longitudinal tape movement with this arrangement.

As will be appreciated, subtle changes in head drum design can result in significant differences in performance characteristics. Consequently, various drum configurations have been developed and those described above represent only a sampling. Each configuration has advantages and disadvantages which are related to a degree to the overall tape scanning system in which the configuration cooperates.

For use in a cartridge video apparatus, a simple helical-scan head drum which requires no special air supply or elaborate tape guides would be desirable. An overall tape scanning system which operates at low tension to reduce head wear would also be desirable, but the tension should be uniform along the tape wrap path to assure uniform head response. It would further be desirable, particularly in a cartridge-type tape scanning system, to provide for protection of the heads and head drum in the event the tape supply jams.

SUMMARY OF THE INVENTION

While friction drag unavoidably occurs when magnetic tape passes over a head drum, drum arrangements according to the invention provide desirably low levels of friction drag by virtue of a specially cut away stationary drum section. A split drum is utilized including a rotating upper section which carries a set of magnetic heads, and a stationary lower section which steps down to a reduced diameter along a predetermined tape wrap path (e.g., a helical wrap path for a helical scan recorder).

It is believed that, by so reducing the diameter of the lower drum section, tape pressure against that stationary lower section is decreased while attendantly shifting tape pressure to the upper section which is rotated at a high speed (the scanning speed of the magnetic heads). Because the upper section rotates at high speed, a thin air bearing is created which offers low resistance to longitudinal tape movement.

It is also significant to note that, by reducing the diameter of the lower section only along the tape wrap path, in accordance with the invention, a shoulder is formed at the lower edge of the reduced-diameter step, which shoulder is adapted to act as a guide for tape travel.

In for a providing for in reduced-diameter area or step, it has been found that friction drag decreases sharply as the reduction relative to the upper drum diameter increases — but only until a difference in diameter of around 3 mils is achieved. Since, on the other hand, a step which is deeply cut may result in distortion of the tape, the diameter reduction is preferably selected to be less than 6 mils. Within a range of 1 to 6 mils, a desirable balance is achieved between drag reduction and limiting of forces that might cause tape distortion. It should be noted that, while the above-mentioned diameter reductions are based upon a nominal drum diameter of around one inch, it appears that the diameter reduction for reducing frictional drag is not significantly influenced by nominal drum diameter.

With the lower drum section reduced in diameter, as discussed above, it has furthermore been found that tolerances and surface finish specifications for that section can be relaxed to reduce fabrication costs.

In a presently preferred implementation, a helical-scan head drum according to the invention cooperates in a "pusher-type" tape advancing system wherein means such as a set of springs applies tension at both supply and takeup ends of the tape, causing the tape to be drawn against the head drum . . . a capstan on the supply side of the tape relative to the head drum then meters tape transport from supply to takeup. Because the head drum, with this arrangement, if not between the capstan and the tape supply, the excessive tape tensions which may be generated by the capstan as it attempts to meter tape in the event of a supply jam are isolated from the head drum. Hence, a significant source of possible damage to the head drum and magnetic heads is avoided with a pusher-type system.

It should be noted, however, that in a pusher-type system, the takeup tension must be sufficient both to move the tape across the head drum and to pull against the capstan to establish a tape tension profile along the tape wrap path. Because, with head drums according to the invention, frictional drag is low, there is little change in tape tension as the tape passes over the head drum. With only a low tension change, tape tension levels along the tape wrap path can be maintained within a narrow range slightly above the minimum tension for sustaining proper operation of the particular magnetic heads which are being utilized. By achieving a flat, low level tension profile along the tape wrap path, head response, which varies with tension, is caused to be substantially uniform and the rate of head wear is kept low. Moreover, only a low tension need be applied at the takeup end of the tape.

Significantly, the above-described characteristics are well suited to a cartridge-type video recording/reproducing unit. By spring loading the reels of the cartridge, the supply and takeup tensions for a pusher-type system can be provided. since snagging of the supply can prove to be more of a problem with a compact tape cartridge than, for example, with separate reels, it becomes particularly desirable to arrange the head drum on the takeup side of the capstan to avoid head damage as discussed above. With a flat low level tape tension profile, head wear is low, head response is uniform, and a light spring in the cartridge can suffice to apply adequate tension-producing torque at the takeup reel. The guide shoulder on the lower section of head drums according to the invention provides, moreover, for accurate tape tracking, for example, in a helical-scan video system. The invention will be described in detail with respect to the drawings, wherein:

FIG. 1 is a perspective view of a helical-scan head drum according to the invention;

FIG. 2 is a partial perspective view of such a head drum;

FIG. 3 is a partial cross-sectional view of such a head drum;

FIG. 4 is a graphical illustration indicating the decoupling achieveable by use of a reduced-diameter step in accordance with the invention;

FIG. 5 is a perspective view of such a head drum incorporated in a pusher-type tape scanning system;

Figure 6A:
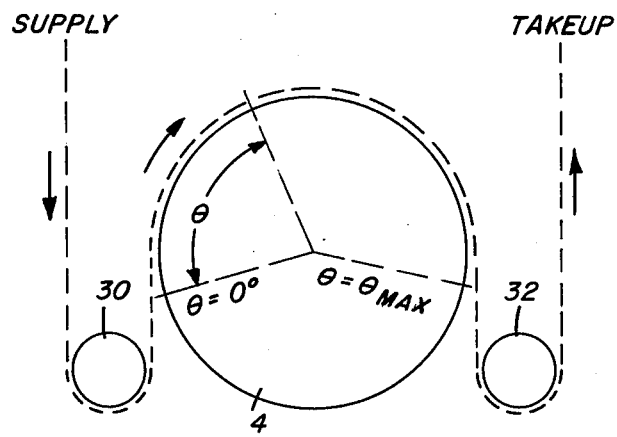
FIG. 6A is a simplified plan view for illustrating the tape wrap path.

It should be noted that the step which is formed, according to the invention, in the lower drum section is greatly exaggerated in the figures for purposes of emphasis and clarity. Without such exaggeration, the change from nominal drum diameter along the step would be scarcely noticeable to the eye.

Referring to FIG. 1, a presently preferred head drum 2, according to the invention, has a rotatable upper section 4 and a stationary lower section 6. The upper section 4 carries a set of magnetic heads 8 and is rotated at a preselected head speed by suitable means such as a motor (not shown). In forming the lower section 6, a reduction ($\Delta$) in diameter, relative to the diameter of the upper section, is provided along a predetermined tape wrap path, for example, the helical path shown, to produce a step 10 (see also FIG. 2, where the radius reduction $\Delta/2$ is emphasized). By reducing the diameter of lower drum section 6 only along the tape wrap path, a ledge or shoulder 12 results at the lower edge of such tape wrap path, which shoulder serves, advantageously, as a tape guide and promotes accurate tape tracking (see FIG. 3). To assure that the tape does not slip over the shoulder 12, it is preferable to select a lower drum section diameter that is somewhat oversized relative to the upper drum section diameter, thereby increasing the shoulder width. In other words, although the dimension ($\Delta$) is of prime concern, the dimension ($\delta$), FIG. 2, is irrelevant.

In reducing the diameter of the lower section 6 to produce the step 10, it has been found that frictional coupling between the tape and the lower section falls off sharply at first and continues to fall until a reduction ($\Delta$) of about 2 mils is achieved. While some decoupling occurs with further diameter reduction, the rate of decoupling is reduced and at around 3 mils the tape and lower drum section are essentially decoupled (the decoupling characteristics are illustrated graphically in FIG. 4). Since distortion of the tape may occur as the diameter difference ($\Delta$) between drum sections 4 and 6 increases, it is preferable to select the difference ($\Delta$) to be less than 6 mils.

The above-discussed diameter differences were determined for a drum of around one-inch diameter and for Estar and Mylar base magnetic tapes of one-quarter inch in width. It has been found, however, that the decoupling characteristics are not strongly influenced by drum diameter. Tape characteristics, such as width and stiffness, do influence the decoupling; however, satisfactory decoupling appears to be achieveable with the commonly encountered types of magnetic tape.

The magnetic tape preferably contacts the drum 2 over a wrap angle of around 190° and extends in part onto the upper section 4 over the entire tape wrap path. If the tape is caused to be entirely on the lower section 6 for a portion of the tape wrap path as, for example, would generally be the case for drums having wrap angles approaching or exceeding 360°, the decoupling effect provided according to the invention would be diminished.

Referring to FIG. 5, a presently preferred implementation of the invention incorporates a head drum 2 of the type described with respect to FIG. 1 in a helical-type tape scanning apparatus.

The preferred scanning apparatus is adapted to receive tape stored in cartridges, for example, a cartridge 22. The cartridge 22 has tape supply and takeup 24 and 26, respectively, and includes means such as a set of springs (not shown) for applying tension at supply and takeup ends of the tape (the tension forces are indicated as $F_S$ and $F_{TU}$, respectively, in FIG. 5). From the supply port 24, the tape passes along a tape path to a capstan assembly 28 which meters tape advance. The tape then proceeds to a roller 30 which, in cooperation with a roller 32, causes the tape to wrap around a head drum 2. (Note that a wrap angle of around 190° is preferred as discussed above.) After passing around the roller 32, the tape returns to the cartridge at takeup port 26.

With this arrangement, the takeup tension force serves to pull the tape past the head drum, after the tape has been metered, through the capstan assembly 28. In so pulling the tape, the takeup tension force establishes a profile of tape tension along the tape path across the head drum 2. It is this tension which urges the tape against a set of magnetic heads 8. As mentioned above, the head drum 2 is, with this arrangement, isolated from the extreme tape tensions which may be generated by the relatively powerful capstan assembly 28 in trying to meter the tape in the event of a supply jam.

Figure 6B:
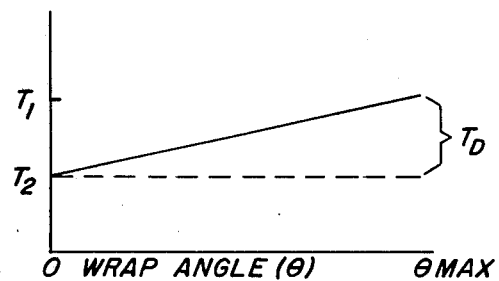
FIG. 6B is a graph indicating a tape tension profile across a head drum.

It is significant to note that a low frictional drag head drum, of the type proposed according to the invention, complements the operation of a pusher-type system (capstan ahead of the head drum in the forward tape direction), as described above, by permitting low and yet uniform tension levels to be established between the capstan 28 and the takeup port 26. Referring to FIG. 6A, the tape wrap path around the head drum 2 is illustrated in simplified form, and a wrap angle ($\theta$) along the tape wrap path is indicated. FIG. 6B then indicates the tension profile along the tape wrap path, $T_1$ being the supply side tension and $T_2$ being the takeup side tension. The difference between supply and takeup tensions is the integrated frictional drag denoted $T_d$.

Figure 6C:
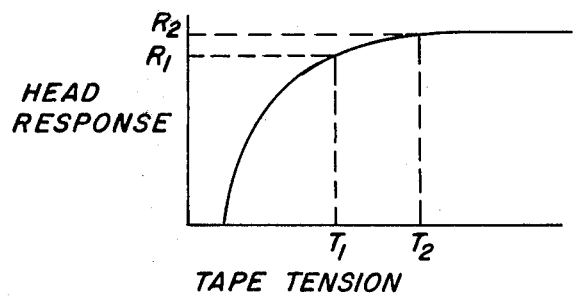
FIG. 6C is a graph indicating head response with respect to tape tension.

FIG. 6C indicates the variation in head response which occurs with variations in tape tension. To provide for a low rate of head wear, it is desirable to have low levels of tape tension. But at low tensions, head response tends to vary more sharply with changes in tape tension, and hence the uniformity of tape tension across the head drum becomes of increased importance. Accordingly, in order to utilize low tensions, it is desirable to minimize tension changes along the tape path. By reducing frictional drag, head drums according to the invention cause the tension range between $T_1$ and $T_2$ to be small and, hence, keep the range of head response narrow (see FIGS. 6B and 6C).

It is noted that, if the upper section of the head drum were to rotate in the direction of forward tape travel, the upper and lower section drag forces would be opposed, rather than additive. In fact, it is possible to form grooves in the upper section to increase coupling thereto and cause a total cancellation of drag forces. Such an approach, however, leads to increased flutter, as is discussed in U.S. Pat. No. 3,840,895. Hence, even for such systems, where the upper drum rotates in the direction of tape travel, a low level of frictional drag for the lower drum section appears nonetheless desirable.

As discussed above, the presently preferred tape scanning system, by allowing uniform head response to be achieved at low tension levels, which have the advantage of reduced head wear, is well suited to a cartridge video tape unit. Such low tension levels may be achieved by a light spring which can be conveniently built into a tape cartridge (see U.S. Pat. No. 2,996,264). Moreover, the guide shoulder of the preferred head drum allows accurate tape tracking to be achieved while utilizing a helical tape wrap path.

The invention has been described in detail with particular reference to a presently preferred implementation thereof; however, it will be appreciated that alterations and modifications within the spirit and scope of the invention will be suggested to those skilled in the art. For example, a tape path which is circular rather than helical might be employed, and head drums according to the invention might be incorporated in a conventional tape scanning system having the capstan located on the takeup side of the head drum.

What is claimed is:

1. An assembly for use in scanning a magnetic tape comprising:
   a first drum section having attached thereto at least one magnetic head and being journaled for rotation about an axis to define trajectory for said head(s), said first drum section having a predetermined diameter about said axis;
   a second drum section which is adjacent to and coaxial with the first drum section and includes means for maintaining such section fixed relative to said axis; and
   means for directing such a tape along a preselected tape wrap path which extends over said first and second drum sections, said path extending over at least a portion of the trajectory of said head(s), said second drum section having a reduced diameter relative to said first drum section along that portion of the preselected tape wrap path which extends over such second drum section.

2. An assembly according to claim 1 wherein said tape wrap path is helical and wherein said second section has a nominal diameter which is at least as great as the diameter of the upper section, whereby a helical guide shoulder is provided along an edge of the tape wrap path.

3. An assembly according to claim 2 wherein said tape wrap path is selected to extend transversely onto both first and second drum sections over the entire length of such path.

4. A head drum configuration for use in scanning magnetic tape which wraps thereover along a preselected path, said configuration comprising:
   a first drum section having a longitudinal axis and being, of preselected diameter over at least tape supporting portions thereof, which section includes journal means for rotatable mounting thereof relative to said axis;
   a second drum section including means for rigid mounting thereof coaxially to said first drum section, said second drum section having a reduced diameter relative to said first drum section along a preselected tape wrap path thereover;
   and at least one magnetic head mounted to said first drum section at a location adjacent to said second drum section and at a distance from said longitudinal axis generally corresponding to the diameter of such first drum section.

5. A head drum configuration for use in scanning magnetic tape having a longitudinal dimension, said configuration comprising:
   a cylindrical upper drum section having a central axis and at least one mounting face which is substantially perpendicular to such axis, such upper drum section being mounted for rotation about such longitudinal axis and having attached to a mounting face thereof at least one magnetic head, and
   a lower drum section which is fixedly mounted to a support to be coaxial with said upper drum section and adjacent to said head(s), said lower drum section having a reduced diameter relative to said upper drum section along a path preselected for longitudinal movement of such a tape thereover.

6. A head drum configuration according to claim 5 wherein the tape path is helical and the diameter of the lower drum section is relatively reduced an amount less than 6 mils.

7. A head drum configuration according to claim 6 wherein the tape path is selected to extend over both upper and lower drum sections for the entire length of such path.

8. In a tape scanning apparatus of the type having a tape supply, a tape takeup, a head drum, and a capstan for metering tape, and wherein the tape passes along a predetermined path from the supply to the capstan, wraps around the head drum to define a helical wrap path, and wherein said apparatus includes means for applying a takeup tension to the tape, the improvement comprising:

a low-frictional-drag head drum having a first section which is cylindrical and has mounted thereto at least one magnetic head, said first section being (1) supported by means for permitting rotation about a central axis thereof and (2) coupled to drive means for causing rotation at a preselected speed about such central axis; and a second section which is coaxial with said first section and has a reduced diameter, relative to said first section, along the tape wrap path thereover, whereby tape pressure against the stationary second section is reduced, said second section including means for maintaining such section in fixed relationship to said central axis.

9. A tape scanning apparatus according to claim 8 wherein said second section has a nominal diameter which is greater than the diameter of said first section, whereby a shoulder is provided on said lower section at an edge of the tape path and wherein the relative reduction in diameter for said second drum section is in the range of 1 to 6 mils.

* * * * *